Dec. 17, 1968  W. P. CONLIN  3,416,818
CONNECTOR
Filed Aug. 23, 1967
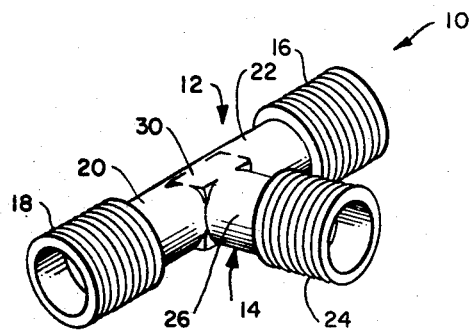
FIG. — 1
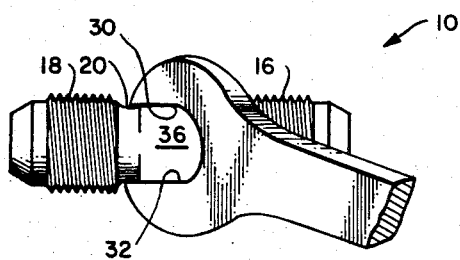
FIG. — 2
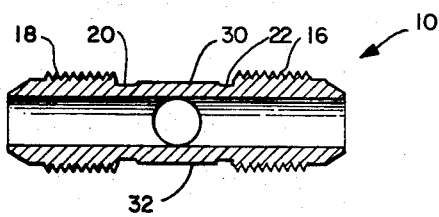
FIG. — 3
INVENTOR.
WILLIAM PATRICK CONLIN
BY
Julius L. Rubinstein
ATTORNEY

United States Patent Office 3,416,818
Patented Dec. 17, 1968

3,416,818
CONNECTOR
William Patrick Conlin, North Hollywood, Calif., assignor to Tech Aero, Incorporated, North Hollywood, Calif.
Filed Aug. 23, 1967, Ser. No. 662,817
4 Claims. (Cl. 285—39)

ABSTRACT OF THE DISCLOSURE

This connector fitting is characterized by a decreased intermediate wall thickness in order to decrease the weight of the connector. The wrench pads integral with the intermediate portions of the connector fittings serve to increase the strength of the connector. At the same time the pads are small in thickness so that the fittings can be installed with smaller wrenches or other tools than was heretofore possible. The edges of the wrench pads of the present connector fittings are stepped down to the arcuate rear surface of the intermediate portions of the connector fitting.

---

This invention relates generally to connector fittings and more particularly to connector fittings for use in aircraft hydraulic systems.

Brief summary

In the area of aircraft design, savings in the weight of components without the sacrifice of strength or reliability is an important object. This is true for conventional jet airplanes and it is even more important in the area of supersonic airplanes. This is because in high speed aircraft a savings in weight of only pounds produces a disproportionately large increase in the range of the aircraft or results in a large decrease in fuel consumption. Since modern aircraft employ hydraulic systems for many control operations, the weight of the tubing and the connector fittings is an important factor. Because there are a great many connector fittings in each hydraulic system, any connector fitting which can be made significantly lighter than any prior connector fittings, without any sacrifice in strength, would provide a desirable saving in weight. Such a connector fitting would be even more useful if it could be conveniently substituted for existing connector fittings.

The overall outside diameter of prior tubular connector fittings employed in aircraft hydraulic systems was equal to the threaded diameter of the connector nut on the hydraulic tubing. However, the inside diameter of the connector fittings was substantially less. This made for a comparatively thick connector fitting wall.

It is clear that if the wall thickness could be reduced, the weight of the connector fitting would be substantially decreased. However, it is not easy to decrease the wall thickness of the connector fitting without sacrificing the ability of the connector fitting to withstand internal pressure or torsional or vibrational load. This problem is further complicated by the requirement that the connector fitting envelope must be compatible with existing hydraulic systems and in particular that the threaded end portions of the connector fittings, the internal diameter of the tubular portion of the connector fittings, and the tube length of the connector fittings all be the same as existing connector fittings.

In the present invention all this is accomplished by decreasing the wall thickness of the intermediate portions of the connector fittings and designing the wrench pads on the intermediate portions of the connector fitting so that the wrench pad increases the rigidity and strength of the connector fitting as a whole. With this arrangement, the resulting connector fitting is, by virtue of its thinner wall, lighter than the prior fittings and because of the reinforcement by the integrally formed wrench pads, the connector fitting is strong enough to do its job.

What is needed therefore, and comprises an important object of this invention, is to provide a connector fitting for aircraft hydraulic systems which is substantially lighter than prior connector fittings and which is completely interchangeable with them.

Another object of this invention is to provide a connector fitting for aircraft hydraulic systems which can be made lighter than prior connector fittings without decreasing the strength of the connector fitting.

Yet another object of this invention is to provide a connector fitting for aircraft hydraulic systems which has the same envelope as prior connector fittings, but which can be made lighter than prior connector fittings without decreasing the strength of the connector fitting.

This and other objects of this invention will become more apparent when better understood in the light of the accompanying drawings and specification, wherein:

FIGURE 1 is a perspective view of a connector fitting for aircraft hydraulic systems embodying the principles of this invention.

FIGURE 2 discloses a small wrench engaging a wrench pad of a fitting constructed according to the principles of this invention.

FIGURE 3 is a longitudinal sectional view of a T-fitting constructed according to the principles of this invention.

Referring now to FIGURE 1 of the drawings, a T-connector fitting for aircraft hydraulic systems constructed according to the principles of this invention is indicated generally by the reference numeral 10. This connector fitting is formed from a suitable light weight material such as aluminum alloy. The connector fitting includes a main tubular portion 12 and a tubular portion 14 at right angles to tubular portion 12. As shown in FIGURE 1, tubular portion 14 is centrally disposed between the ends of portion 12.

Tubular portions 12 and 14 communicate with each other (see FIGURES 1 and 3). The opposed end portions 16 and 18 of tubular portion 12 are provided with standard size threads for connection with connecting nuts on the tubing of the hydraulic system in a manner well known in the art. The wall thickness of portions 20 and 22 adjacent to the threaded end portions 16 and 18 is reduced and portions 20 and 22 have a reduced outside diameter in the embodiment shown, but the inside diameter of the tubular fitting is uniform and standard. This decreased wall thickness resulting from this arrangement decreases the weight of the connector fitting.

Similarly, tubular portion 14 has a threaded end portion 24 with a standard sized thread for connection with tubing in a manner well known in the art. In addition, tubing portion 26 adjacent end portion 24 also has a reduced outside diameter, but in this particular embodiment, the inside diameter of tubular portion 14 is uniform and standard.

A wrench pad 28 is integrally formed between tubular portions 20, 22 and 26. As seen in FIGURES 1 and 3, the wrench pad has generally parallel upper and lower surfaces 30 and 32. The rear edges of the wrench pads are stepped down to join the rear arcuate surface of the intermediate portion of the connector. This reduced size makes it possible to work on and connect the connector fittings with a smaller wrench and in a more reduced space than was heretofore possible (see FIGURE 2). In addition, because less wrench space is required, the connector fitting and the entire hydraulic system can be mounted closer to the inner walls or bulkheads of the aircraft. Consequently, less structural edge distance and clearance is required. This has the effect of increasing the useful volume in the airplane.

In addition, the rear arcuate surface 36 of the intermediate portion 20 cooperates with the planar upper and lower surfaces of the wrench pad to provide a better fit with the wrench (see FIGURE 2). Consequently, when fittings are located in crowded places where wrench clearance is very limited, the fittings constructed according to the present invention can be quickly and more easily attached or disconnected.

The wrench pad on the T-shaped connector fitting serves an added function in reinforcing the tubular portions 12 and 14 permitting the connector fitting to withstand greater torsional and vibrational stresses and internal hydraulic pressures. Consequently, the weight saving achieved by decreasing the wall thickness at the portion of the connector fitting intermediate to the threaded end portions is not made at the sacrifice of the strength of the connector fitting. This as explained above is because of the configuration of the wrench pad.

Although the above description of the invention has emphasized the use of the connector in a T-shaped fitting, it is understood and it is contemplated that the principles of this invention are applicable to all configurations and sizes of hydraulic and pneumatic fittings.

Obviously many modifications and variations of the present invention are possible in the light of the above teachings.

I claim:

1. A connector fitting of the class described comprising a first generally tubular portion with threaded end portions and an intermediate portion, the wall thickness of the intermediate portion less than the wall thickness of the end portion, the outside diameter of the threaded end portions larger than the outside diameter of the intermediate portion, and a reinforcing wrench pad, said wrench pad integrally formed with said intermediate portion and having planar upper and lower surfaces generally tangent with the upper and lower surfaces of the said intermediate portion, the rear edges of said planar and upper and lower surfaces of the wrench pad stepped toward the surface of the intermediate portion whereby the planar surfaces of the wrench pad and the surface of the intermediate portion form a matching fit with the work contacting surfaces of a wrench.

2. A connector fitting of the class described comprising a first generally tubular portion with threaded end portions and an intermediate portion, the wall thickness of the intermediate portion generally less than the wall thickness of the end portion, the outside diameter of the threaded end portions larger than the outside diameter of the intermediate portion, a second tubular portion generally transverse to said first tubular portion and integrally formed therewith at a point centrally disposed between the ends of the first tubular portion to form a T-shaped connector fitting, and a reinforcing wrench paid, said wrench pad integrally formed with said intermediate portion and having planar upper and lower surfaces generally tangent with the upper and lower surfaces of the intermediate portion, the rear edges of said planar upper and lower surfaces of the wrench pad stepped toward the surface of the intermediate portion whereby the planar surfaces of the wrench pad and a surface of the intermediate portion can engage a large area of the work contacting surfaces of a wrench.

3. A connector fitting of the class described comprising a first generally cylindrical tubular portion with threaded end portions and an intermediate portion, the wall thickness of the intermediate portion generally less than the wall thickness of the end portion, the outside diameter of the threaded end portions larger than the outside diameter of the intermediate portion, a second tubular generally cylindrical portion transverse to said first tubular portion and integrally formed therewith at a point centrally disposed between the ends of the first tubular portion to form a T-shaped connector fitting, and a wrench pad serving both to strengthen the connector fitting and to accommodate a wrench, said wrench pad integrally formed with said intermediate portion and having planar upper and lower surfaces generally tangent with the upper and lower surfaces of the said intermediate portion, the rear edges of said planar upper and lower surfaces of the wrench pad stepped toward the cylindrical intermediate portion of the connector fitting whereby the planar surfaces of the wrench pad and a portion of the cylindrical surface of the intermediate portion form a mating fit with the work contacting surfaces of a wrench.

4. A connector fitting of the class described comprising a first generally tubular portion with threaded end portions and an intermediate portion, the wall thickness of the intermediate portion less than the wall thickness of the end portions, the outside diameter of the threaded end portions larger than the outside diameter of the intermediate portion, and a reinforcing wrench pad, said wrench pad integrally formed with said intermediate portion and having planar upper and lower surfaces generally tangent with the upper and lower surfaces of the said intermediate portion said wrench pad having side portions forming front and rear edges, said edges of said planar upper and lower surfaces of the wrench pad stepped toward the surface of the intermediate portion whereby the planar surfaces of the wrench pad form a matching fit with the work contacting surfaces of a wrench.

References Cited

UNITED STATES PATENTS

| | | |
|---|---|---|
| 509,458 | 11/1893 | Still. |
| 1,497,398 | 6/1924 | Axelson et al. |
| 1,903,121 | 3/1933 | Lussier. |
| 1,935,425 | 11/1933 | Wiggins. |
| 2,034,553 | 3/1936 | Askin. |

CARL W. TOMLIN, *Primary Examiner.*

DAVE W. AROLA, *Assistant Examiner.*

U.S. Cl. X.R.

285—156